United States Patent
Das

(10) Patent No.: US 12,229,691 B2
(45) Date of Patent: Feb. 18, 2025

(54) UNCERTAINTY QUANTIFICATION FOR MACHINE LEARNING CLASSIFICATION MODELLING

(71) Applicant: Intuit, Inc., Mountain View, CA (US)

(72) Inventor: Kamalika Das, Saratoga, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/122,641

(22) Filed: Mar. 16, 2023

(65) Prior Publication Data

US 2024/0311665 A1   Sep. 19, 2024

(51) Int. Cl.
*G06N 7/01* (2023.01)
*G06N 5/022* (2023.01)

(52) U.S. Cl.
CPC ............... *G06N 7/01* (2023.01); *G06N 5/022* (2013.01)

(58) Field of Classification Search
CPC .................................. G06N 7/01; G06N 5/022
See application file for complete search history.

(56) References Cited

PUBLICATIONS

Graepel et al., Web-Scale Bayesian Click-Through Rate Prediction for Sponsored Search Advertising in Microsoft's Bing Search Engine, Proceedings of te 27th International Conference on Machine Learning, 2010. (Year: 2010).*
Ji et al., A Unified View of Loss Functions in Supervised Learning, Apr. 2019. (Year: 2019).*
He et al., Practical Lessons from Predicting Clicks on Ads at Facebook, ADKDD, Aug. 14, 2014. (Year: 2014).*
Provost, Foster, Machine Learning from Imbalanced Data Sets 101, Invited paper for the AAAI, Workshop on Imbalanced Data Sets, 2000. (Year: 2000).*
Chapelle et al., Simple and Scalable Response Prediction for Display Advertising, ACM Transactions on Intelligent Systems and Technology, vol. 5, No. 4, Dec. 2014. (Year: 2014).*
Tian et al., A Music Recommendation System Based on Logistic Regression and extreme Gradient Boosting, International Joint Conference on Neural Networks, Jul. 2019. (Year: 2019).*
Liu et al, Credit Evaluation with a Data Mining Approach Based on Gradient Boosting Decision Tree, ICAACE 2021. (Year: 2021).*
Xinran He, et al.: "Practical Lessons from Predicting Clicks on Ads at Facebook". 2014. In Proceedings of the Eighth International Workshop on Data Mining for Online Advertising (ADKDD'14). Association for Computing Machinery, New York, NY, USA, 1-9. https://doi.org/10.1145/2648584.2648589.

* cited by examiner

*Primary Examiner* — Marshall L Werner
(74) *Attorney, Agent, or Firm* — Dinsmore & Shohl LLP

(57) ABSTRACT

Certain aspects of the disclosure provide a method, comprising: processing input data with an ensemble of nonlinear machine learning models; generating a sparse high-dimensional embedding based on one or more leaf nodes of each nonlinear machine learning model in the ensemble of nonlinear machine learning models; projecting the high-dimensional embedding into a lower-dimensional embedding, wherein the lower-dimensional embedding is less sparse than the high-dimensional embedding; processing the lower-dimensional embedding with a linear machine learning model to generate a binary class prediction; determining a confidence for the binary class prediction; and outputting: the binary class prediction if the confidence is greater than or equal to a threshold; or a flipped binary class prediction if the confidence is lower than the threshold.

18 Claims, 5 Drawing Sheets

UNCERTAINTY QUANTIFICATION FOR MACHINE LEARNING CLASSIFICATION MODELLING

INTRODUCTION

Aspects of the present disclosure relate to systems and methods for determining confidence in machine learning model predictions (or inferences), such as a binary class prediction.

Machine learning is generally the process of producing a trained model (e.g., a decision tree), which represents a generalized fit to a set of training data that is known a priori. Applying the trained model to new data enables the production of inferences, which may be used to gain insights into the new data. For example, machine learning models may be used to assign a class label to examples from a problem domain, which is referred to as classification modeling. Binary classification models predict one of two classes, while multi-class classification models predict one of more than two classes. Classification models may generally be linear or nonlinear.

Linear models generally assume that input features and the model output (e.g., a classification label) are linearly related and that a linear function may therefore describe the underlying relationship. Linear models are efficient to train, simple to implement, and work well for linearly related data. However, many real world modeling problems involve nonlinear relationships between input features and output(s), and thus linear models often cannot be used in real world scenarios.

Nonlinear models, on the other hand, are compatible with nonlinear relationships between input features and outputs (e.g., a classification label output). However, nonlinear models are often computationally expensive and time-consuming to train (and to retrain). Further, such models may be much larger (e.g., having much higher parameter counts) compared to linear models, and thus they may be unsuitable for deployment in various contexts and on certain types of lower power devices. Moreover, it is generally not possible to determine the confidence of a prediction generated by a nonlinear model. In some cases, determining the confidence of a prediction from a machine learning model can be as important as the prediction itself. For example, when predicting a critical output, knowing that the prediction is 51% confident or 91% confident could make all the difference in reliance on the prediction.

Consequently, a technical problem exists in the art in which it is not possible to determine confidence of predictions from nonlinear models, which are the only types of models capable of modeling more complex real world scenarios. Accordingly, there is a need for improved machine learning model architectures capable of modeling nonlinear data while also providing a confidence for predictions.

SUMMARY

Certain aspects provide a method, comprising: processing input data with an ensemble of nonlinear machine learning models; generating a sparse high-dimensional embedding based on one or more leaf nodes of each nonlinear machine learning model in the ensemble of nonlinear machine learning models; projecting the high-dimensional embedding into a lower-dimensional embedding, wherein the lower-dimensional embedding is less sparse than the high-dimensional embedding; processing the lower-dimensional embedding with a linear machine learning model to generate a binary class prediction; determining a confidence for the binary class prediction; and outputting: the binary class prediction if the confidence is greater than or equal to a threshold; or a flipped binary class prediction if the confidence is lower than the threshold.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
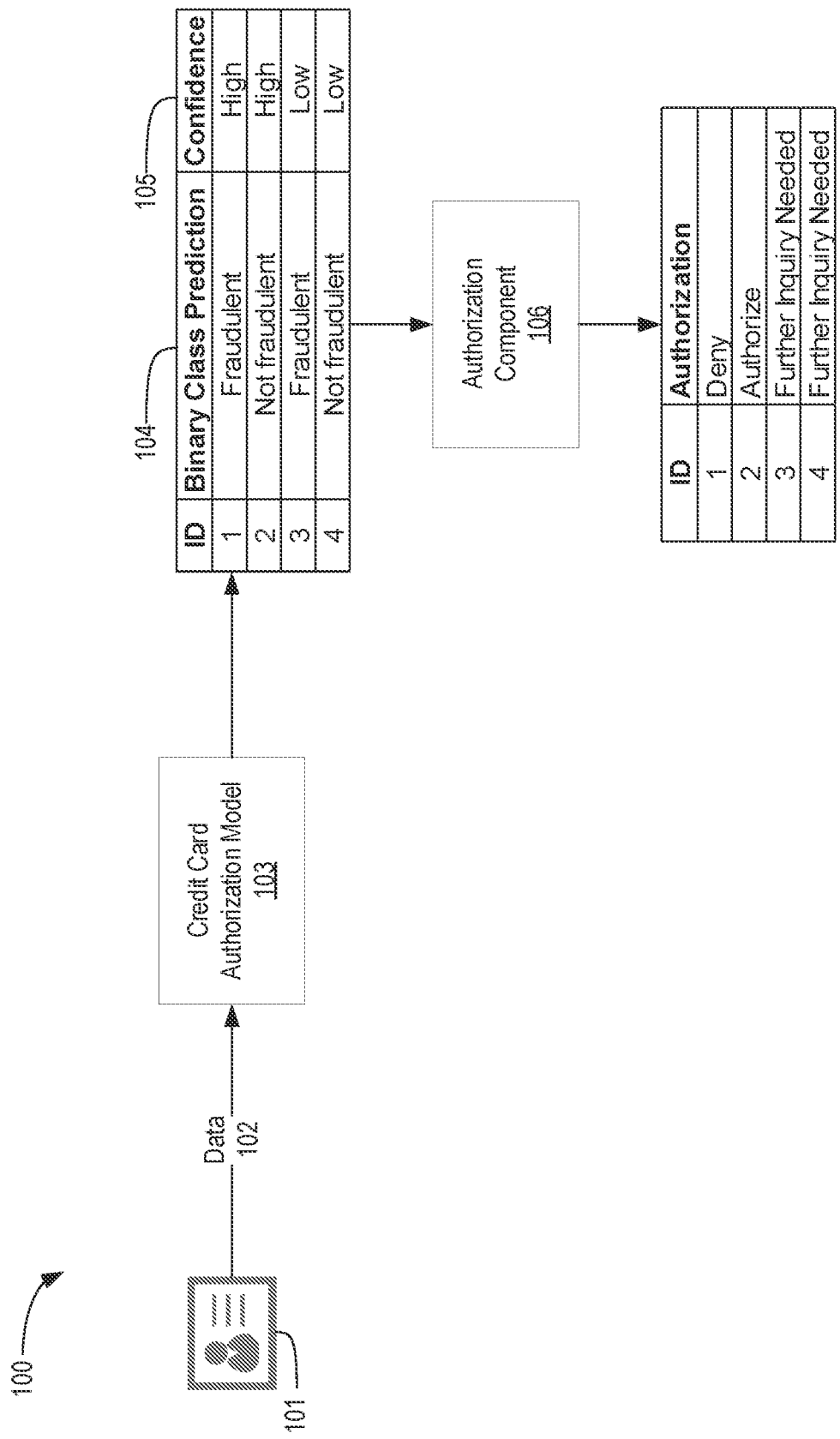
FIG. 1 depicts an example flowchart for authorizing transactions using a hybrid model architecture.

Aspects of the present disclosure provide apparatuses, methods, processing systems, and computer-readable mediums for modeling nonlinear data while also providing a confidence for predictions, such as by way of binary class prediction models.

As above, a technical problem exists in the art in which the types of models most capable of modeling complex scenarios are not simultaneously capable of providing a confidence of their predictions. Practically speaking, this can lead to over (or under) confidence in such models. Aspects described herein provide a technical solution to this problem and beneficially increase the reliability of the machine learning models by using a nonlinear model to encode nonlinear features in a format usable by a linear model to determine a prediction (or inference), such as a binary class prediction, with an associated confidence estimate (e.g., a numerical score or categorical ranking). As such, a nonlinear model is used as a feature encoder and a linear model is used as an output and confidence predictor. Due to the hybrid nonlinear feature encoder/linear predictor nature of the machine learning model architectures described herein, many technical benefits are achieved. For example, nonlinear interactions of the input data can be modeled by the nonlinear feature encoder while the linear predictor provides predictions with associated confidence—beneficially combining the best aspects of both types of model architectures. As another example, in many cases, only the predictor portion of the model needs to be retrained (or updated) over time as the underlying data naturally changes. Because the predictor portion is linear, its training is generally computationally and time-wise efficient. The interval for retraining the nonlinear feature encoder may be beneficially much longer.

Using the aspects described herein, a prediction, such as a binary class prediction, associated with a high confidence may more often be relied upon, such as to assist in the performance of some useful tasks. Relatedly, where a prediction is associated with a low confidence, the prediction may be discarded in favor of another prediction or decision method. Beneficially, this improves decision-making by reducing false positives and false negatives associated with the nonlinear model while also providing a confidence associated with the prediction. Thus, the utility of the machine learning model may be improved compared to conventional methods.

The applications for the machine learning model architectures described herein are many. Generally, classification models, such as binary class prediction models, are described herein as one such application. For example, a binary classification problem may be to determine whether a given transaction is fraudulent or not. In the case of, for example, a credit card transaction, a binary classification model may use data associated with the credit card transaction to determine if the transaction is fraudulent or not. Unlike traditional nonlinear models to make this prediction, aspects described herein further provide a confidence of this prediction so that action taken based on the prediction, such as authorization or not of the transaction may be performed more confidently.

Some aspects described herein use a boosted tree model (e.g., XGBoost) as a nonlinear feature encoder coupled with a Bayesian logistic regression model as a predictor, and may be referred to as hybrid or XBLR-type models. Notably, these are just one example architecture, and others are possible consistent with the various aspects described herein.

XGBoost Models

Extreme gradient boosting ("XGBoosting") is generally an implementation of gradient boosting an ensemble of decision tree models, which may be used for classification modeling.

A decision tree is generally a type of nonlinear classification model that may be trained to make class predictions, including binary class predictions. Multiple decision trees may be trained together to form an ensemble model. Boosted trees are ensembles of decision trees, wherein decision trees are processed in series and each subsequent tree is trained to reduce the errors of the prior tree. The boosted model then combines the predictions of all the trees to make a final class prediction. XGBoost in particular is beneficially more flexible and more efficient compared to other types of tree-based models due to regularization parameters and parallel computation.

Notably, though, an XGBoost model will not indicate how confident its prediction is. For example, an XGBoost model may predict whether a given transaction is fraudulent or not, but the XGBoost model will not indicate how confident the model is in that prediction. As another example, an XGBoost model may predict whether an individual is eligible for a loan or not, but the XGBoost model will not indicate how confident the model is in that prediction. When using a model to make any such sensitive predictions, it is important to not only generate an accurate prediction, but to also know the confidence of the prediction so appropriate action may be taken based on the model prediction. Generally, where the costs of an incorrect action (e.g., false positives and false negatives) based on the model output are high, understanding how confident the model is in a given prediction is beneficial for improving the ultimate task outcome.

Bayesian Logistic Regression Models

Bayesian logistic regression generally refers to a Bayesian-enhanced implementation of logistic regression modeling.

A logistic regression model is generally a linear type of classification model. A Bayesian logistic regression model may have a binary response variable, which is the probability of one event (e.g., a positive event) versus another event (e.g., a negative event). With a Bayesian logistic regression model, there is a set of unknown parameters (coefficients) with a prior distribution. The posterior distribution is computed by normalizing the prior. However, in Bayesian logistic regression, the posterior is not Gaussian, but it can be approximated to a Gaussian distribution through, for example, Laplace approximation. Then, the Bayesian logistic regression model outputs a posterior probability distribution over the parameter estimates. The posterior distribution is a one n-dimensional distribution, where n is the number of features in the encoding, which corresponds to the number of parameters (or coefficients), representing a mean vector and covariance matrix. Further, a credible interval around the parameter estimates is determined. A credible interval is the range containing a particular percentage of probable values. For example, if a credible interval is 80%, then the 80% credible interval is the portion of the posterior distribution containing 80% of the values. Thus, the output may be interpreted as: given the input data, the effect has an 80% probability of falling within the posterior distribution. Thus, a Bayesian logistic regression also gives a confidence, the credible interval around the predicted probability.

A linear model, such as a Bayesian logistic regression, is efficient to implement, train, and interpret. However, as discussed above, linear models assume a linear relationship between the input variables and the output. A linear model generally cannot model nonlinear interactions and may consequently over-simplify relationships among the variables and decrease model accuracy.

Example Application of Hybrid Model Architecture to Authorization of Transactions FIG. 1 depicts an example flowchart 100 for authorizing transactions, in this case credit card transactions, using the hybrid machine learning model architectures described herein. Note that while credit card authorization is described herein as one example use case, many other use cases are possible. For example, the transaction may be any sort of electronic transaction, such as an attempt to access data, a credit decision, a purchase outcome, a resource usage category, and the like. More generally, the model architectures described herein may generally process any sort of tabular data with a set of features and a binary label.

Initially, flow 100 begins when a credit card 101 is used to initiate a payment transaction. Data 102 associated with the credit card transaction is processed by a credit card authorization model 103 to determine whether the credit card transaction is fraudulent or not. In this example, credit card authorization model 103 is implemented by a hybrid architecture machine learning model having a nonlinear feature encoder component and a linear predictor component, as generally described above (e.g., an XBLR model). For example, the nonlinear feature component may be an XGBoost model and the linear predictor component may be a Bayesian logistic regression model.

In this example, credit card authorization model 103 processes data 102 to determine a binary class prediction 104 of whether the credit card transaction is fraudulent and a confidence estimate 105 associated with the binary class prediction 104. Confidence estimate 105 generally indicates how confident credit card authorization model 103 is in its binary class prediction 104. Note, in this example confidence estimate 105 is a categorical value (e.g., high or low), but in other examples, confidence estimate may comprise a numerical value, such as a percentage confidence score.

For example, credit card authorization model 103 may determine transaction 1 to be fraudulent with a high confidence estimate. In another example, credit card authorization model 103 may determine transaction 2 to be not fraudulent with a high confidence estimate. In yet another example, credit card authorization model 103 may determine transaction 3 to be fraudulent with a low confidence estimate. In yet another example, credit card authorization model 103 may determine transaction 4 to be not fraudulent with a low confidence estimate.

Authorization component 106 may then deny, authorize, or require further inquiry for each transaction based on the binary class prediction 104 and confidence estimate 105 for each transaction. For example, where credit card authorization model 103 determines transaction 1 to be fraudulent with a high confidence estimate, authorization component 106 may deny the credit card transaction as fraudulent. In another example, where credit card authorization model 103 determines transaction 2 to be not fraudulent with a high confidence estimate, authorization component 106 may authorize the credit card transaction. In yet another example, where credit card authorization model 103 determines a binary class prediction 104 has a low confidence estimate 105, such as in transaction 3 and transaction 4, authorization component 106 may require further inquiry for the transaction. In some embodiments, further inquiry by authorization component 106 may include flipping the binary class prediction 104 based on the confidence estimate 105. In some embodiments, further inquiry by authorization component 106 may include flagging a transaction for manual (e.g., human) review.

In this example, authorization component 106 is a type of task component that takes as input the output of the predictive model (credit card authorization model 103) and determines a task based on that input. Note that many other types of task components are possible.

Figure 2:
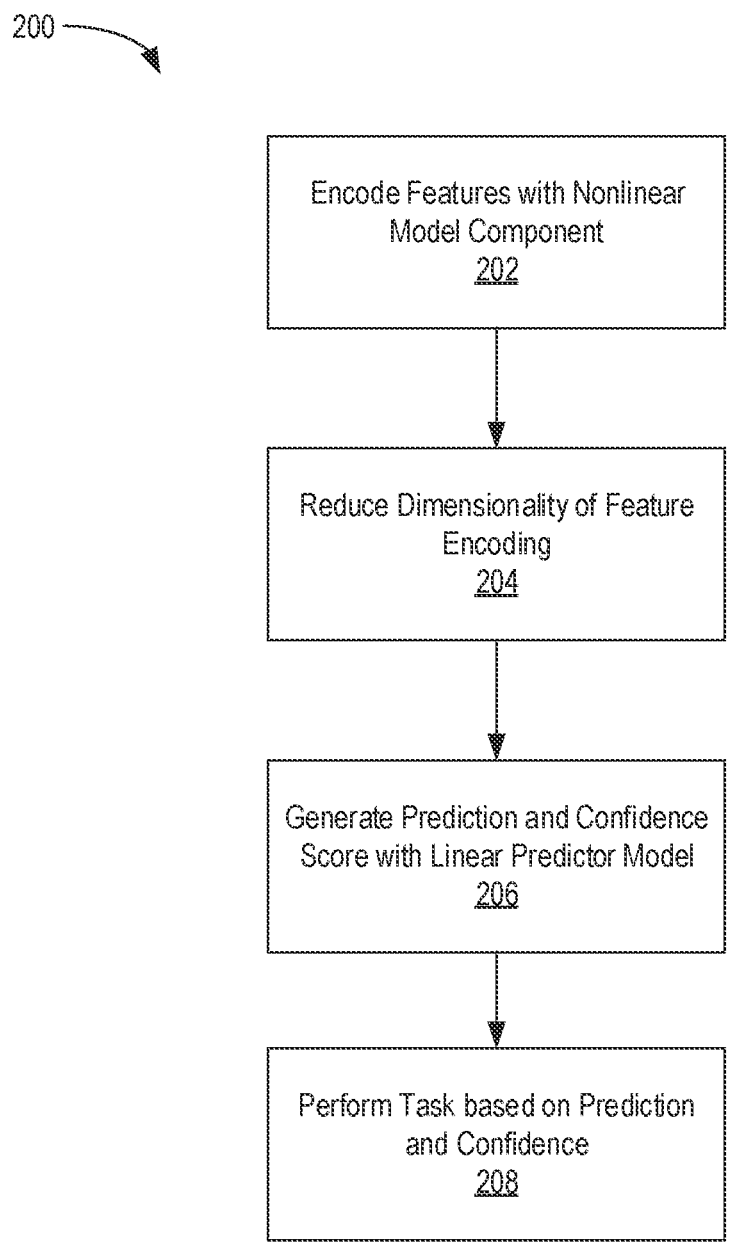
FIG. 2 depicts an example flowchart for determining a binary class prediction and a confidence estimate associated with the binary class prediction.

Determining a Binary Class Prediction and Confidence Associated with a Binary Class Prediction FIG. 2 depicts an example flowchart 200 for determining a class prediction (e.g., a binary class prediction) and a confidence estimate associated with the class prediction. For example, flow 200 may be implemented by credit card authorization model 103, described with respect to FIG. 1.

Flow 200 begins at step 202 with generating a feature encoding, also referred to as an embedding, using a nonlinear model, such as a binary XGBoost classifier model. As explained in more detail with respect to FIG. 3, step 202 is unconventional in that the actual predictive output of the nonlinear model is not used, but rather an encoding is generated based on the state of the nonlinear model after processing. For example, when using a tree-based model, the state of each of the ensembled tree models is used after processing the input data to create the feature encoding. In another example, a neural network model may use the state of nodes in a layer prior to the final output layer to generate the feature encoding.

In some cases, the feature encoding generated at step 202 is a high-dimensional binary feature encoding that captures feature interactions that are predictors for a classification problem, such as a binary classification problem.

Flow 200 then proceeds to step 204 with reducing the dimensionality of the feature encoding. In one example, step 204 may be performed using principal component analysis. Generally, higher-dimensional encoded features may be projected to a lower-dimensional space (e.g., onto principal components in the lower dimensional space) using a dimensionality reduction technique like principal component analysis. With principal components analysis, a first principal component is generally a linear combination of the encoded features that explains the most variance in the encoded features. A second principal component is a linear combination of the encoded features that explains the most variance once the effect of the first principal component is removed. Subsequent principal components are linear combinations of the encoded features that explain the most variance once the effect of the prior principal components are removed.

Beneficially, whether using principal components analysis or another dimensionality reduction technique, the resulting lower-dimensional encoded features preserve a meaningful percentage of the discriminative interactions in the encoded features while reducing, sometimes dramatically, the computational complexity of any follow-on analysis of the lower-dimensional encoded features, such as by a predictor component of the hybrid model architectures described herein. Further, the lower-dimensional encoded features (e.g., the embedding) is generally denser (less sparse) than the high-dimensional encoded features, which may improve the performance of follow-on analysis of the lower-dimensional encoded features, such as by a predictor component of the hybrid model architectures described herein. As described below with respect to FIG. 3, certain encoding schemes, such as one-hot encoding, may generate very sparse data, and so a dimensionality reduction technique may beneficially improve the density of such encodings for further processing, such as by a predictor component of a hybrid model architecture (e.g., an XBLR model architecture).

Flow 200 then proceeds to step 206 with generating a prediction and associated confidence estimate using a linear model, such as a binary class prediction and confidence estimate using a Bayesian logistic regression model trained to process the lower-dimensional encoded features obtained at step 204.

In some embodiments, a confidence estimate, such as confidence estimate 105 in FIG. 1, may be determined by the Bayesian logistic regression model. A confidence estimate may be determined, for example, by assigning a prior distribution for each parameter of the Bayesian logistic regression model, and determining a mean prediction and covariance matrix of the posterior distribution for each parameter based on the prior distribution.

In some embodiments, a class prediction, such as binary class prediction 104 in FIG. 1, may be generated based on an integration of the posterior distribution of each respective parameter over a range of the respective parameter.

In some embodiments, the posterior distribution for each parameter of the Bayesian logistic regression may be sampled using a Laplace approximation to determine a Gaussian distribution for each parameter. Beneficially, using Laplace approximation may be computationally efficient where the first and second derivatives are readily computable.

In some embodiments, a threshold for the confidence estimate, such as confidence estimate 105 in FIG. 1, may indicate whether the class prediction, such as binary class prediction 104 in FIG. 1, may be outputted or if the class prediction should be flipped. For example, the binary class prediction may be outputted if the confidence is greater than or equal to a threshold. In another example, a flipped binary class prediction may be outputted if the confidence is lower than a threshold.

Flow 200 then proceeds to step 208 with performing a task based on the output of step 206 (e.g., the output of a Bayesian logistic regression model), namely the prediction and the confidence estimate associated with the prediction. As described above, the confidence estimate associated with the prediction beneficially puts the prediction in context and allows for the task performance to be based on an additional aspect. For example, where a sensitive task, such as a transaction authorization, credit decision, purchase outcome, resource usage category, and others is based on the prediction, and the prediction is associated with a low confidence estimate, the task decision process may ignore the prediction and/or cause an intervention to be performed, such as a manual (e.g., human) review of a process.

In some aspects, step 208 is performed by a task component, such as authorization component 106 of FIG. 1.

Note that flow 200 is just one example, and other flows including fewer, additional, or alternative steps, consistent with this disclosure, are possible.

Example Method for Encoding Features

Figure 3:
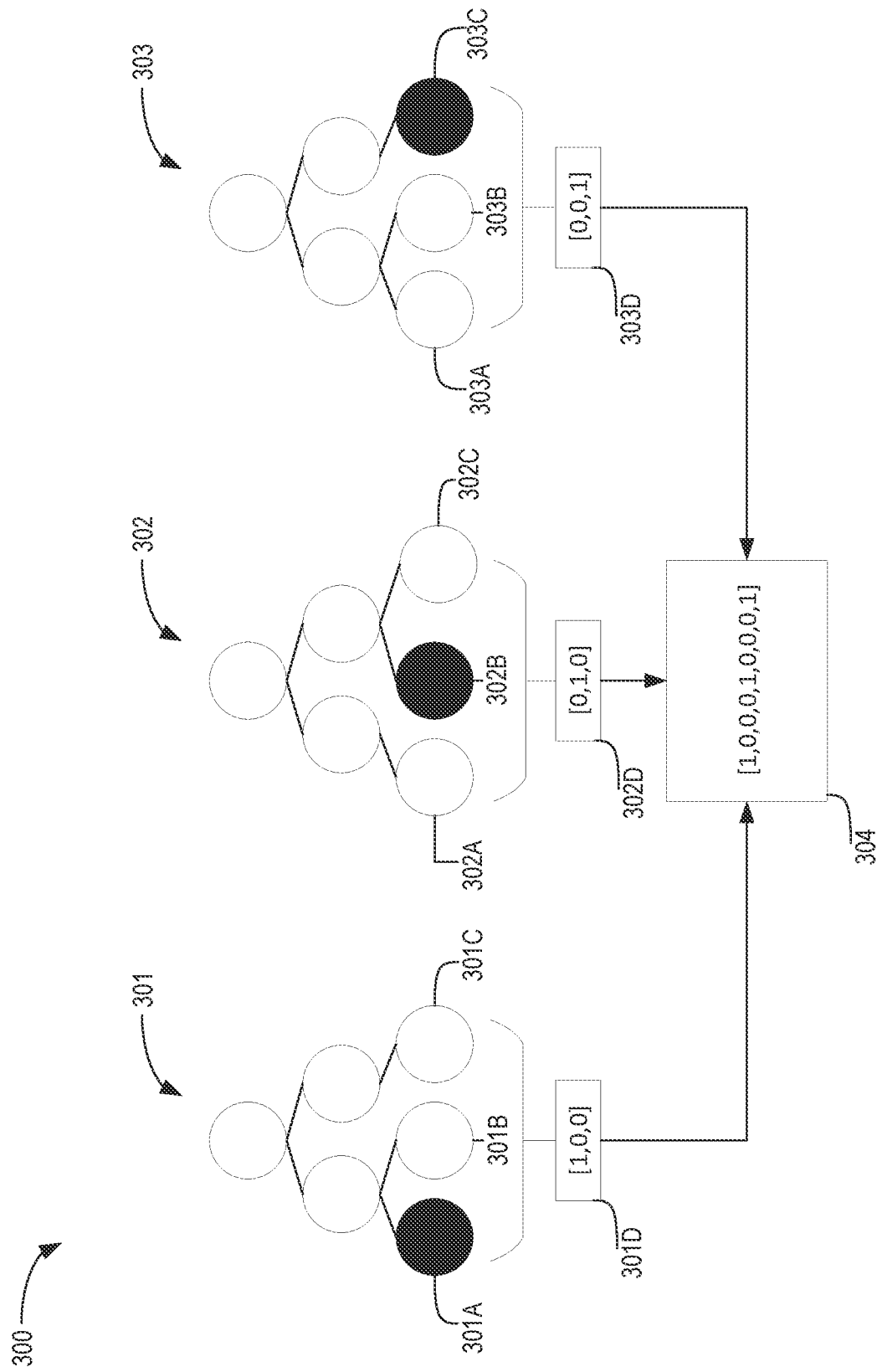
FIG. 3 depicts an example method for encoding features through an ensemble of decision trees.

FIG. 3 depicts an example method 300 for encoding features (e.g., creating a feature embedding) using an ensemble of decision trees, such as with an XGBoost model. The process of FIG. 3 may be used for encoding features at step 202 of FIG. 2.

In the depicted example, an ensemble of decision trees, such as an XGBoost classifier model, captures feature interactions for a classification problem as input data is processed by the decision trees. Generally, these feature interaction may be captured in a high-dimensional embedding, such as 304.

Generally, input data to an ensembled tree model, such as an XGBoost classifier model, may be a set of features associated with the predictive problem, in which the features may be used to generate the ensembled tree model. In some embodiments, each feature may form a root node for a tree in the ensemble. In some embodiments, a subset of the original features may form root nodes for the trees in the ensemble.

For every input data instance traversing the tree ensemble, the path of each tree traversal may be represented as an ordered index of the leaf nodes of the tree. In FIG. 3, traversal of tree 301 returns a prediction of the first leaf node 301A, which creates ordered index 301D. Traversal of tree 302 returns a prediction of the second leaf node 302B, which creates ordered index 302D. Traversal of tree 303 returns a prediction of the third leaf node 303C, which creates ordered index 303D. Note that in this example each ordered index is a one-hot encoding in which only one value in the ordered index is 1 and all other values are 0. In other aspects, other encoding mechanisms may be used based on each tree's output.

As each input data instance traverses the entire tree ensemble, the ordered indices (e.g., 301D, 302D, and 303D) are concatenated to generate the high-dimensional feature encoding 304.

In this example, the number of elements in the high-dimensional feature encoding 304 is equal to the total number of leaf nodes for all trees in the ensemble, which is a total of nine elements in this example.

Notably, when using an encoding scheme such as one-hot encoding, the high dimensional feature encoding 304 will generally be very sparse, and the sparsity may increase as each tree gets deeper and the number of leaf nodes in the final layer of each tree increases. Because highly sparse input data may negatively affect the performance of follow-on model components, such a linear predictor component, dimensionality reduction techniques, such as principal components analysis described above with respect to FIG. 2, may be employed to beneficially compress the data into a lower-dimensional feature encoding. In addition to increasing the performance of subsequent models, the lower-dimensional feature encoding also reduces the computational complexity and size of subsequent models, which makes the overall architecture more computationally efficient and smaller, such that it can be processed with less compute, power, and memory.

Note that method 300 is just one example, and other methods including fewer, additional, or alternative steps, consistent with this disclosure, are possible.

Training and Retraining a Hybrid Model Architecture

The hybrid model architectures described herein may be trained to determine a binary class prediction and a confidence estimate for various tasks and use cases, as described herein.

In some embodiments, the nonlinear model aspects of the hybrid model may be trained (or retrained) independently from the linear model aspects of the hybrid model. Generally, an XGBoost model is trained to find the best hyperparameters that fit training data and labels. In some embodiments, XGBoost model training may be evaluated by minimizing a second order gradient of the loss function.

During training of an XGBoost model, the hyperparameters are optimized. In tree-based models, like XGBoost models, hyperparameters may include the maximum depth of the tree, the number of trees in the ensemble, the number of variables for each tree, the minimum number of samples on a leaf, and the fraction of observations used to build a tree. A range is set for the hyperparameter values and the training algorithm for the model chooses the best set of hypermeters based on the training data and metric to be optimized. Generally, the hyperparameter for the number of trees in the ensemble may be set to a large number, such as 100. When an XGBoost model is used as a classification predictor, the number of trees in the ensemble may be shifted to a larger range, such as from 50 to 100. However, when using an XGBoost model as a feature encoder, a smaller ensemble, or number of trees may be used. In some embodiments, the feature encoding XGBoost model hyperparameter of number of trees in the ensemble is not optimized and the number of trees may be set to less than 6. In some embodiments, the feature encoding XGBoost model hyperparameter of number of trees in the ensemble is optimized for the best number of trees and the hyperparameter range may be set to from 2 to 5.

Generally, training (or retraining) nonlinear models, such as an XGBoost model, may be computationally expensive and time-consuming. In some embodiments, the nonlinear model may be trained (or retrained) less frequently than the linear model. For example, the nonlinear model may be trained (or retrained) less frequently because the feature interactions encoded by the nonlinear model are slow to change.

In some embodiments, the linear model aspects of the hybrid model may be trained independently from the nonlinear aspects of the hybrid model. In some embodiments, the Bayesian logistic regression model may be trained with the lower-dimensional embedding and the class labels assigned to the XGBoost model. In some embodiments, the Bayesian logistic regression model may be trained by sampling a posterior distribution for each parameter of the Bayesian logistic regression model using a Laplace approximation to determine a Gaussian distribution for each parameter. One or more of the parameters, in some embodiments, may be updated based on a computed loss based on the binary class prediction, which may be, for example, an exponential loss. In some embodiments, the Bayesian logistic regression model may be trained (or retrained) more frequently than the binary XGBoost classifier model.

In some embodiments, the nonlinear model and the linear model may be trained (or retrained) together. In some embodiments, the nonlinear model and the linear model may be trained (or retrained) with the same dataset, including, for example, training the nonlinear model and the linear model together on the same data set or training the nonlinear model and the linear model independently on the same data set.

Figure 4:
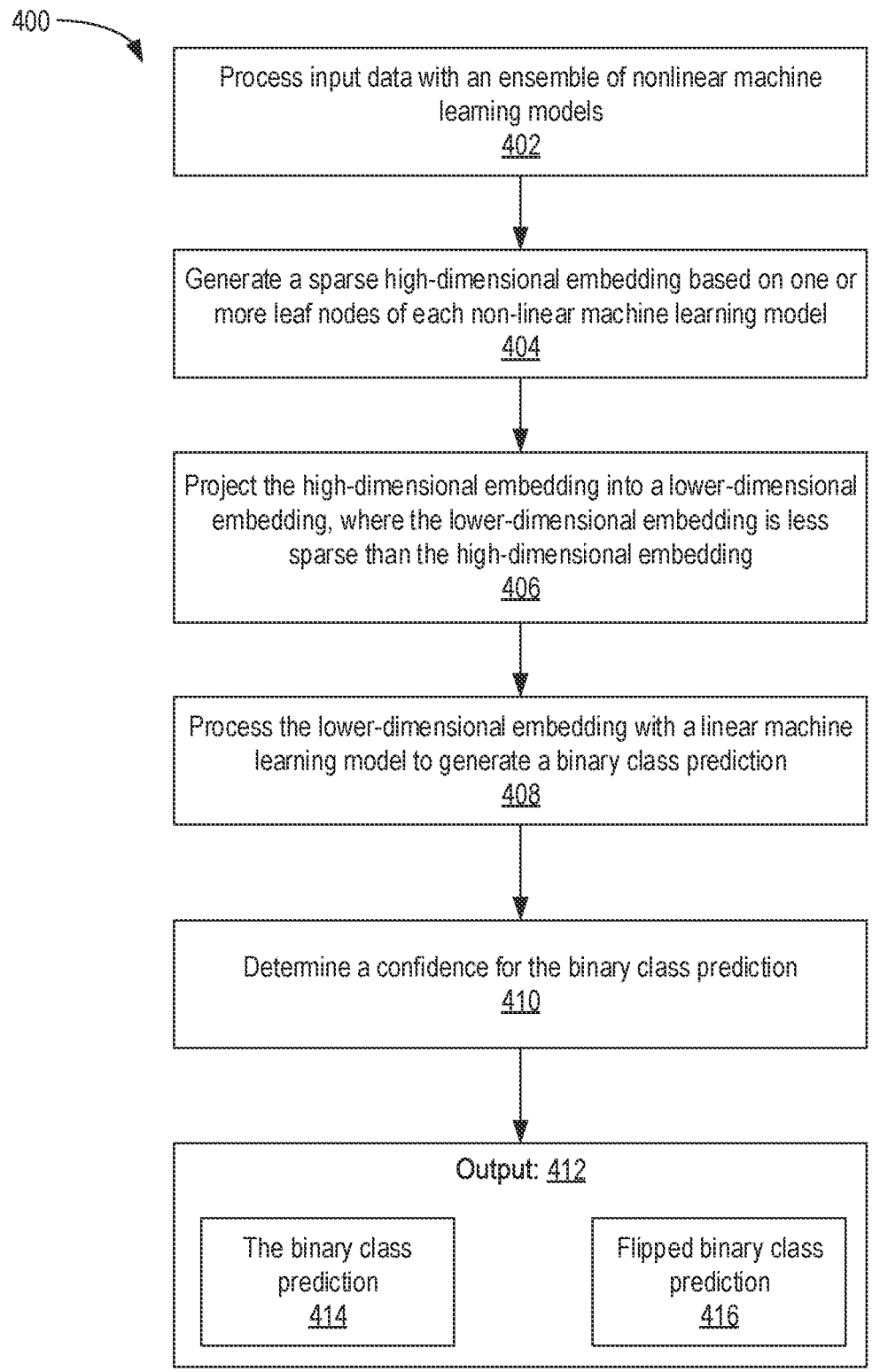
FIG. 4 depicts an example method for determining a binary class prediction and a confidence estimate associated with the binary class prediction.

Example Method for Determining a Binary Class Prediction and a Confidence for the Binary Class Prediction FIG. 4 depicts an example method 400 for determining a binary class prediction and a confidence associated with the binary class prediction.

Method 400 begins at step 402 with processing input data with an ensemble of nonlinear machine learning models. In some embodiments, the input data may be data 102, as described in FIG. 1.

In some embodiments, the ensemble of nonlinear machine learning models comprises a tree-based model. For example, the tree-based model may comprise trees 301, 302, and 303, as described in FIG. 3.

In some embodiments, the tree-based model comprises an XGBoost model, such as used to encode the features in FIG. 3.

Method 400 then proceeds to step 404 with generating a sparse high-dimensional embedding based on one or more leaf nodes of each nonlinear machine learning model. For example, the sparse high-dimensional embedding may be based on leaf nodes 301A, 301B, and 301C of tree 301, leaf nodes 302A, 302B, and 302C of tree 302, and leaf nodes 303A, 303B, and 303C of tree 303, as described in FIG. 3.

In some embodiments, generating the sparse high-dimensional embedding comprises concatenating a one-hot encoding of the one or more leaf nodes of each nonlinear model in the ensemble of nonlinear machine learning models. For example, the sparse high-dimensional embedding may be one-hot encoded ordered indices 301D, 302D, or 303D, as described in FIG. 3.

Method 400 then proceeds to step 406 with projecting the high-dimensional embedding into a lower-dimensional embedding, where the lower-dimensional embedding is less sparse than the high-dimensional embedding.

In some embodiments, projecting the high-dimensional embedding into a lower-dimensional embedding comprises applying principal components analysis to the high-dimensional embedding to generate the lower-dimensional embedding, such as to reduce the dimensionality of the feature encoding described with respect to step 204 of flow 200 in FIG. 2.

Method 400 then proceeds to step 408 with processing the lower-dimensional embedding with a linear machine learning model to generate a binary class prediction, such as the prediction generated at step 206 of flow 200 in FIG. 2.

In some embodiments, the linear machine learning model comprises a Bayesian logistic regression model.

Method 400 then proceeds to step 410 with determining a confidence for the binary class prediction, such as the confidence estimate generated at step 206 of flow 200 in FIG. 2.

In some embodiments, determining the confidence for the binary class prediction comprises: assigning a prior distribution for each parameter of the linear machine learning model; and determining a mean prediction and a covariance matrix of a posterior distribution for each parameter of the linear machine learning model based on the prior distribution.

Method 400 then proceeds to step 412 with outputting the binary class prediction if the confidence is greater than or equal to a threshold; or a flipped binary class prediction if the confidence is lower than the threshold.

In some embodiments, method 400 further includes integrating a posterior distribution of each respective parameter of the linear model over a range of the respective parameter in order to generate the binary class prediction.

In some embodiments, method 400 further includes sampling a posterior distribution for each parameter of the linear machine learning model using a Laplace approximation to determine a Gaussian distribution for each parameter.

In some embodiments, method 400 further includes computing a loss based on the binary class prediction; and updating one or more parameters of the linear machine learning model based on the loss.

In some embodiments, the loss comprises an exponential loss.

Note that method 400 is just one example, and other methods including fewer, additional, or alternative steps, consistent with this disclosure, are possible.

Example Computing Device

Figure 5:
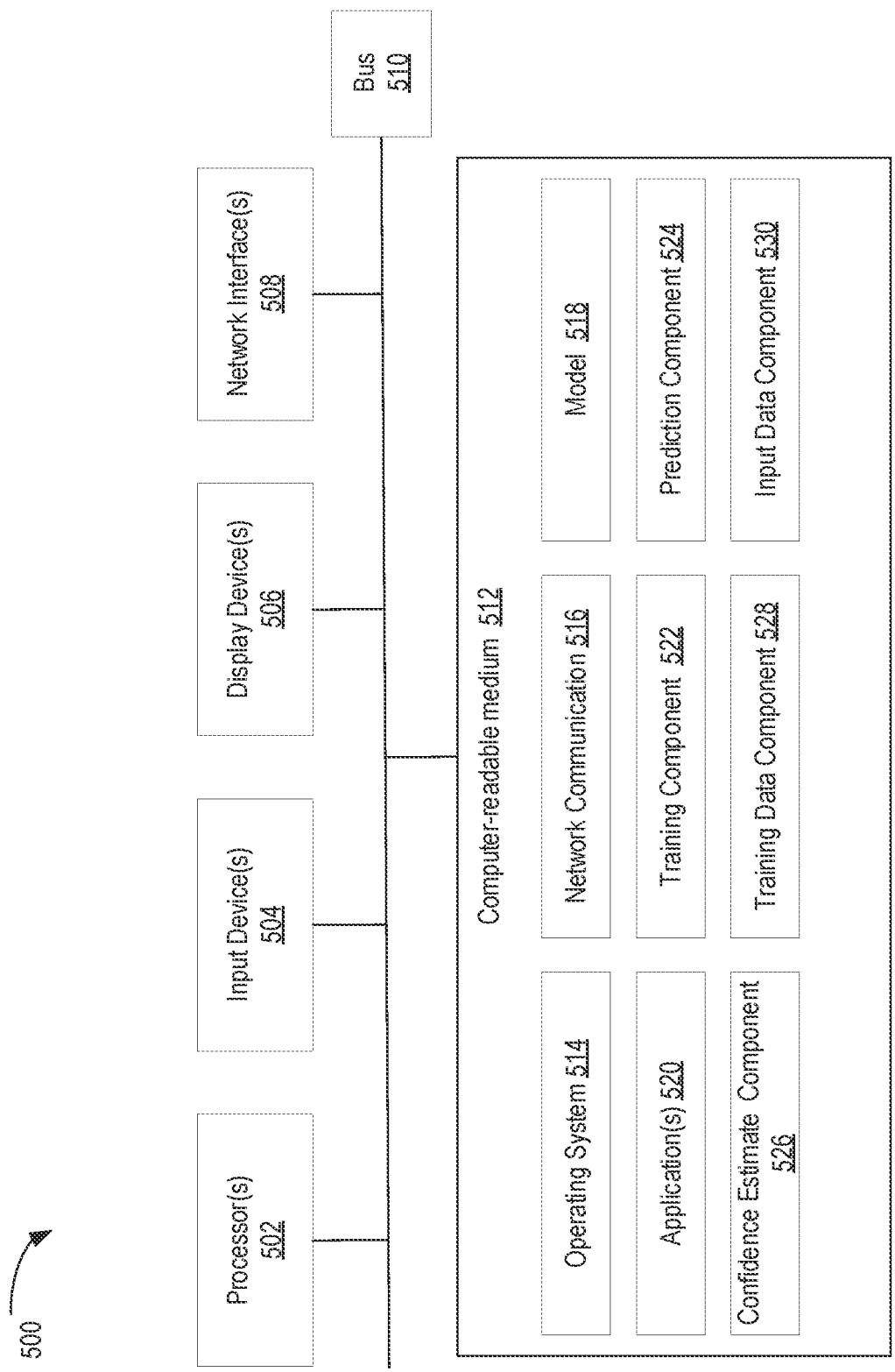
FIG. 5 depicts an example computing device for implementing various features and processes of the various aspects described herein.

FIG. 5 depicts a block diagram of an example computing device 500 that implements various features and processes, based on the methods described herein. For example, the computing device 500 may perform one or more steps of flow 200 and methods 300 and 400. The computing device 500 is implemented on any electronic device that runs software applications derived from complied instructions, including without limitation, personal computers, servers, smart phones, media players, electronic tablets, game consoles, email devices, etc. In some implementations, the computing device 500 includes one or more processors 502, one or more input devices 504, one or more display devices 506, one or more network interfaces 508, and one or more computer-readable medium 512. Each of these components may be coupled by a bus 510.

Display devices 506 includes any display technology, including but not limited to display devices using Liquid Crystal Display (LCD) or Light Emitting Diode (LED) technology. Processor(s) 502 may use any processor technology, including but not limited to graphics processors and multi-core processors. Input devices 504 may include any known input device technology, including but not limited to a keyboard (including a virtual keyboard), mouse, track ball, and touch-sensitive pad or display. Bus 510 includes any internal or external bus technology, including but not limited to, ISA, EISA, PCI, PCI Express, USB, Serial ATA or FireWire. Computer-readable medium 512 includes any non-transitory computer readable medium that provides instructions to processor(s) 502 for executing, including without limitation, non-volatile storage media (e.g., optical discs, magnetic disks, flash drives, etc.), or volatile media (e.g., SDRAM, ROM, etc.).

Computer-readable medium 512 includes various instructions 514 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 504; sending output to display device 506; keeping track of files and directories on computer-readable medium 512; controlling peripheral devices (e.g., disk drives, printers, etc.) which can be controlled directly or through an I/O controller; and managing traffic on bus 510. Network communications instructions 516 establish and maintain network connections (e.g., software for implementing communication protocols, such as TCP/IP, HTTP, Ethernet, telephony, etc.).

Model 518 includes instructions that implement the hybrid model architecture disclosed herein, including a feature encoder component and a predictor component as described above. For example, a hybrid model architecture may include an XGBoost model as a feature encoder component and a Bayesian logistic regression as the predictor component. Input data component 530 may include input data to be used by model 518.

Application(s) 520 may comprise an application that uses or implements the processes described herein and/or other processes. For example, application 520 may implement a hybrid model, such as model 518, to perform a task based on the prediction and confidence estimate generated by the model. The processes may also be implemented in the operating system.

Training component 522 includes instructions to train a hybrid model, such as model 518. Training data component 528 includes training data used by training component 522 in training the model.

Prediction component 524 may include data relating to a generated prediction, such as a binary class prediction 104 in FIG. 1. Confidence estimate component 526 may include data relating to a generated confidence estimate, such as confidence estimate 105 in FIG. 1.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication network include, e.g., a telephone network, a LAN, a WAN, and the computers and network forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Example Clauses

Implementation examples are described in the following numbered clauses:

Clause 1: A method, comprising: processing input data with an ensemble of nonlinear machine learning models; generating a sparse high-dimensional embedding based on one or more leaf nodes of each nonlinear machine learning model in the ensemble of nonlinear machine learning models; projecting the high-dimensional embedding into a lower-dimensional embedding, wherein the lower-dimensional embedding is less sparse than the high-dimensional embedding; processing the lower-dimensional embedding with a linear machine learning model to generate a binary class prediction; determining a confidence for the binary class prediction; and outputting: the binary class prediction if the confidence is greater than or equal to a threshold; or a flipped binary class prediction if the confidence is lower than the threshold.

Clause 2: The method of Clause 1, wherein projecting the high-dimensional embedding into a lower-dimensional embedding comprises applying principal components analysis to the high-dimensional embedding to generate the lower-dimensional embedding.

Clause 3: The method of any one of Clauses 1-2, wherein generating the sparse high-dimensional embedding comprises concatenating a one-hot encoding of the one or more leaf nodes of each nonlinear machine learning model in the ensemble of nonlinear machine learning models.

Clause 4: The method of any one of Clauses 1-3, wherein determining the confidence for the binary class prediction comprises: assigning a prior distribution for each parameter of the linear machine learning model; and determining a mean prediction and a covariance matrix of a posterior distribution for each parameter of the linear machine learning model based on the prior distribution.

Clause 5: The method of any one of Clauses 1-4, further comprising integrating a posterior distribution of each respective parameter of the linear machine learning model over a range of the respective parameter in order to generate the binary class prediction.

Clause 6: The method of any one of Clauses 1-5, wherein the ensemble of nonlinear machine learning models comprises a tree-based model.

Clause 7: The method of Clause 6, wherein the tree-based model comprises an XGBoost model.

Clause 8: The method of any one of Clauses 1-7, wherein the linear machine learning model comprises a Bayesian logistic regression model.

Clause 9: The method of any one of Clauses 1-8, further comprising sampling a posterior distribution for each parameter of the linear machine learning model using a Laplace approximation to determine a Gaussian distribution for each parameter.

Clause 10: The method of any one of Clauses 1-9, further comprising: computing a loss based on the binary class prediction; and updating one or more parameters of the linear machine learning model based on the loss.

Clause 11: The method of Clause 10, wherein the loss comprises an exponential loss.

Clause 12: A processing system, comprising means for performing a method in accordance with any one of Clauses 1-11.

Clause 13: A non-transitory computer-readable medium comprising computer-executable instructions that, when executed by a processor of a processing system, cause the processing system to perform a method in accordance with any one of Clauses 1-11.

Clause 14: A computer program product embodied on a computer-readable storage medium comprising code for performing a method in accordance with any one of Clauses 1-11.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
    processing nonlinear input data associated with an electronic data transaction with an ensemble of tree-based nonlinear machine learning models to generate an output at each leaf node of each tree-based nonlinear machine learning model, wherein the output is based on a traversal path of each tree-based nonlinear machine learning model in the ensemble of tree-based nonlinear machine learning models;
    generating a high-dimensional embedding based on the output of each leaf node of each tree-based nonlinear machine learning model in the ensemble of tree-based nonlinear machine learning models, wherein the high-dimensional embedding encodes one or more nonlinear features associated with the nonlinear input data traversed in the traversal path of each tree-based nonlinear machine learning model in the ensemble of tree-based nonlinear machine learning models;
    projecting the high-dimensional embedding into a lower-dimensional embedding by applying a dimensionality reduction function, wherein:
        the dimensionality reduction function is based on a principal component analysis, and
        the lower-dimensional embedding comprises a lower-dimensional representation of the one or more nonlinear features;
    processing the lower-dimensional embedding with a Bayesian logistic regression machine learning model to generate a binary class prediction associated with the nonlinear input data;
    determining a confidence for the binary class prediction with the Bayesian logistic regression machine learning model, wherein the confidence for the binary class prediction is based on a credible interval of the binary class prediction and the nonlinear input data; outputting:
        the binary class prediction if the confidence is greater than or equal to a threshold; or
        a flipped binary class prediction if the confidence is lower than the threshold; and
    authorizing the electronic data transaction based on the binary class prediction or the flipped binary class prediction.

2. The method of claim 1, wherein generating the high-dimensional embedding comprises concatenating a one-hot encoding of the output of each leaf node of each tree-based nonlinear machine learning model in the ensemble of tree-based nonlinear machine learning models.

3. The method of claim 1, wherein determining the confidence for the binary class prediction with the Bayesian logistic regression machine learning model comprises:
    assigning a prior distribution for each parameter of the Bayesian logistic regression machine learning model; and
    determining a mean prediction and a covariance matrix of a posterior distribution for each parameter of the Bayesian logistic regression machine learning model based on the prior distribution.

4. The method of claim 1, further comprising integrating a posterior distribution of each respective parameter of the Bayesian logistic regression machine learning model over a range of the respective parameter in order to generate the binary class prediction.

5. The method of claim 1, wherein the ensemble of tree-based nonlinear machine learning models comprises an XGBoost model.

6. The method of claim 1, further comprising sampling a posterior distribution for each parameter of the Bayesian logistic regression machine learning model using a Laplace approximation to determine a Gaussian distribution for each parameter.

7. The method of claim 6, further comprising:
    computing a loss based on the binary class prediction; and
    updating one or more parameters of the Bayesian logistic regression machine learning model based on the loss.

8. The method of claim 7, wherein the loss comprises an exponential loss.

9. The method of claim 1, wherein the ensemble of tree-based nonlinear machine learning models is trained independently from the Bayesian logistic regression machine learning model.

10. The method of claim 1, wherein the binary class prediction or the flipped binary class prediction indicate the electronic data transaction is fraudulent.

11. A processing system, comprising: a memory comprising computer-executable instructions; and a processor configured to execute the computer-executable instructions and cause the processing system to:
    process nonlinear input data associated with an electronic data transaction with an ensemble of nonlinear machine learning models to generate an output at each leaf node of each tree-based nonlinear machine learning model, wherein the output is based on a traversal path of each tree-based nonlinear machine learning model in the ensemble of tree-based nonlinear machine learning models;
generate a high-dimensional embedding based on the output of each leaf node of each tree-based nonlinear machine learning model in the ensemble of nonlinear machine learning models, wherein the high-dimensional embedding encodes one or more nonlinear features associated with the nonlinear input data traversed in the traversal path of each tree-based nonlinear machine learning model in the ensemble of tree-based nonlinear machine learning models;
project the high-dimensional embedding into a lower-dimensional embedding by applying a dimensionality reduction function, wherein:
the dimensionality reduction function is based on a principal component analysis, and
the lower-dimensional embedding comprises a lower-dimensional representation of the one or more nonlinear features;
process the lower-dimensional embedding with a Bayesian logistic regression machine learning model to generate a binary class prediction associated with the nonlinear input data;
determine a confidence for the binary class prediction with the Bayesian logistic regression machine learning model, wherein the confidence for the binary class prediction is based on a credible interval of the binary class prediction and the nonlinear input data;
output:
the binary class prediction if the confidence is greater than or equal to a threshold; or
a flipped binary class prediction if the confidence is lower than the threshold; and
authorize the electronic data transaction based on the binary class prediction or the flipped binary class prediction.

12. The processing system of claim 11, wherein in order to generate the high-dimensional embedding, the processor is further configured to cause the processing system to: concatenate a one-hot encoding of the output of each leaf node of each tree-based nonlinear machine learning model in the ensemble of tree-based nonlinear machine learning models.

13. The processing system of claim 11, wherein in order to determine the confidence for the binary class prediction with the Bayesian logistic regression machine learning model, the processor is further configured to cause the processing system to:
assign a prior distribution for each parameter of the Bayesian logistic regression machine learning model; and
determine a mean prediction and a covariance matrix of a posterior distribution for each parameter of the Bayesian logistic regression machine learning model based on the prior distribution.

14. The processing system of claim 11, wherein the processor is further configured to cause the processing system to:
integrate a posterior distribution of each respective parameter of the Bayesian logistic regression machine learning model over a range of the respective parameter in order to generate the binary class prediction.

15. The processing system of claim 11, wherein the processor is further configured to cause the processing system to:
sample a posterior distribution for each parameter of the Bayesian logistic regression machine learning model using a Laplace approximation to determine a Gaussian distribution for each parameter.

16. The processing system of claim 11, wherein the processor is further configured to cause the processing system to:
compute a loss based on the binary class prediction; and
update one or more parameters of the Bayesian logistic regression machine learning model based on the loss.

17. The processing system of claim 11, wherein:
the ensemble of tree-based nonlinear machine learning models comprises an XGBoost model.

18. A method, comprising:
processing nonlinear input data associated with an electronic data transaction with an ensemble of nonlinear machine learning models to generate an output at each leaf node of each tree-based nonlinear machine learning model, wherein the output is based on a traversal path of each tree-based nonlinear machine learning model in the ensemble of tree-based nonlinear machine learning models;
generating a high-dimensional embedding based on the output of each leaf node of each tree-based nonlinear machine learning model in the ensemble of nonlinear machine learning models, wherein the high-dimensional embedding encodes one or more nonlinear features associated with the nonlinear input data traversed in the traversal path of each tree-based nonlinear machine learning model in the ensemble of tree-based nonlinear machine learning models;
projecting the high-dimensional embedding into a lower-dimensional embedding by applying a dimensionality reduction function, wherein:
the dimensionality reduction function is based on a principal component analysis to the high-dimensional embedding to generate the lower-dimensional embedding, and
the lower-dimensional embedding comprises a lower-dimensional representation of the one or more nonlinear features;
processing the lower-dimensional embedding with a Bayesian logistic regression machine learning model to generate a binary class prediction associated with the nonlinear input data, comprising integrating a posterior distribution of each respective parameter of the Bayesian logistic regression machine learning model over a range of the respective parameter, wherein the binary class prediction indicates whether the electronic data transaction is fraudulent;
determining a confidence for the binary class prediction with the Bayesian logistic regression machine learning model wherein the confidence for the binary class prediction is based on a credible interval of the binary class prediction and the nonlinear input data, comprising:
assigning a prior distribution for each parameter of the Bayesian logistic regression machine learning model; and
determining a mean prediction and a covariance matrix of a posterior distribution for each parameter of the Bayesian logistic regression machine learning model based on the prior distribution;
outputting:
the binary class prediction if the confidence is greater than or equal to a threshold; or a flipped binary class prediction if the confidence is lower than the threshold; and authorizing the electronic data transaction based on the binary class prediction or the flipped binary class prediction.

\* \* \* \* \*